June 13, 1967  C. L. DAVIS  3,324,964
TRACTOR HAVING HYDRAULIC DRIVE AND CONTROLS
Filed June 1, 1964  5 Sheets-Sheet 1
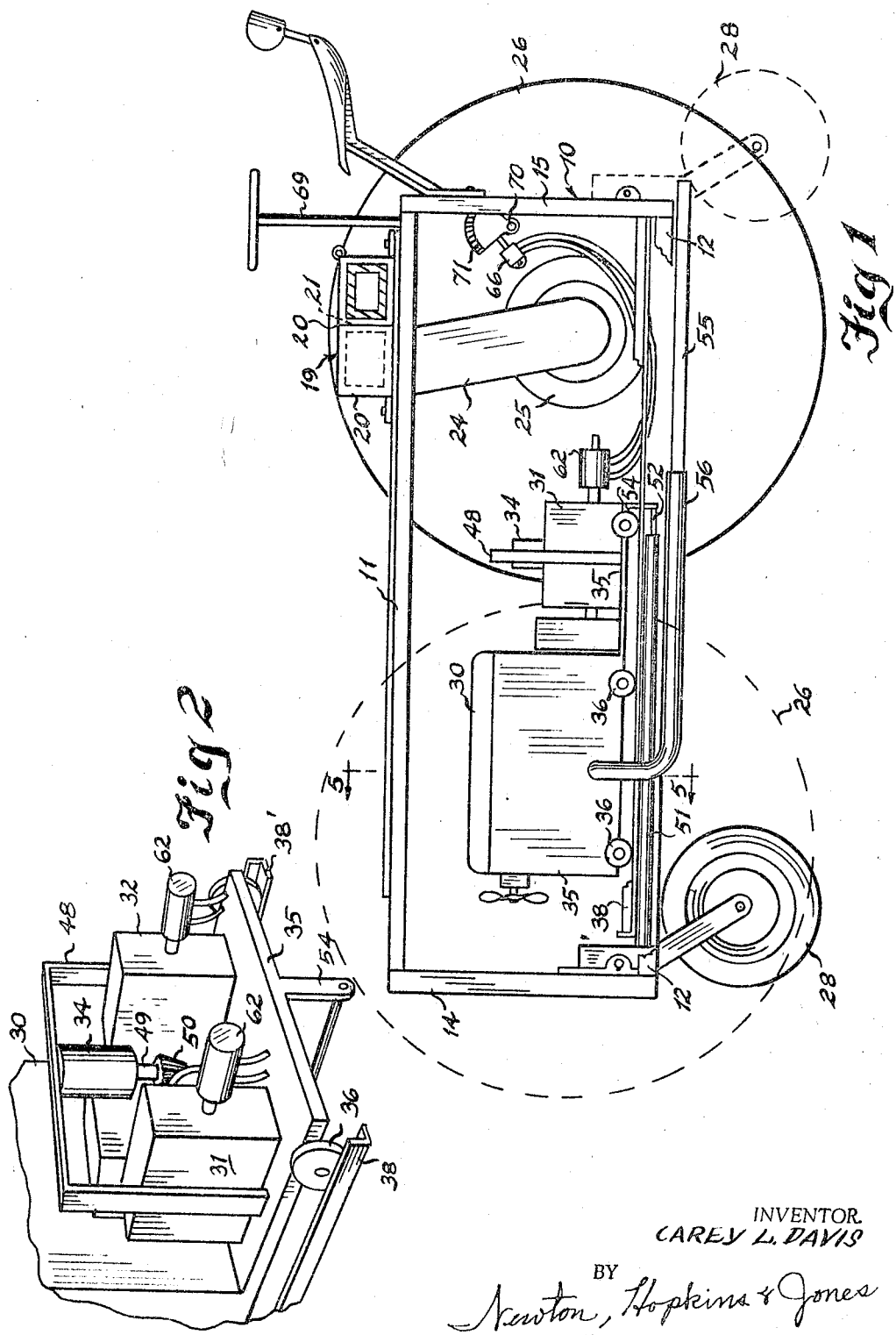
INVENTOR.
CAREY L. DAVIS
BY Newton, Hopkins & Jones
ATTORNEYS INVENTOR.
CAREY L. DAVIS
BY Newton, Hopkins & Jones
ATTORNEYS 3,324,964
TRACTOR HAVING HYDRAULIC DRIVE
AND CONTROLS
Carey L. Davis, 1691 Dresden Drive NE.,
Atlanta, Ga. 30319
Filed June 1, 1964, Ser. No. 371,388
7 Claims. (Cl. 180—6.48)

This invention relates to self-moving vehicles, and is more particularly concerned with farm tractors and the like.

Vehicles such as farm tractors, in the past, have been used to perform a wide variety of tasks, many for which they are not truly suited. Previous tractors have been of somewhat conventional drive and control which has required considerable attention from the operator just to operate the vehicle, taking attention away from the task to be performed by the tractor.

In certain instances, tractors will rotate about their rear axle causing danger to the operator. Also, the tractor is not performing its intended work when it rears up since the force is used to raise the front of the tractor rather than to pull the intended load.

The tractor of the present invention overcomes the above mentioned objections by providing a tractor having hydraulic motors to drive the tractor, and hydraulic control means in conjunction with the drive motors to form an integral drive and control system. The drive and control system makes the control quite simple, and operable through a single control means. The prime mover for the tractor is movable longitudinally of the tractor, in response to the force exerted by the drive motors, to be positioned to prevent rotation of the tractor about its rear axle. The wheels of the tractor are movable longitudinally of the tractor so the drive wheels can be placed on either end of the tractor.

These and other features and advantages of the invention will become apparent from consideration of the following specification when taken in conjunction with the accompanying drawings in which:

FIG. 1 is a side elevational view of one preferred embodiment of the present invention having one of the drive wheels broken away, and showing alternate positions of the wheels in broken lines.

FIG. 2 is a perspective view of the hydraulic pumps and their relative locations.

Figure 3:
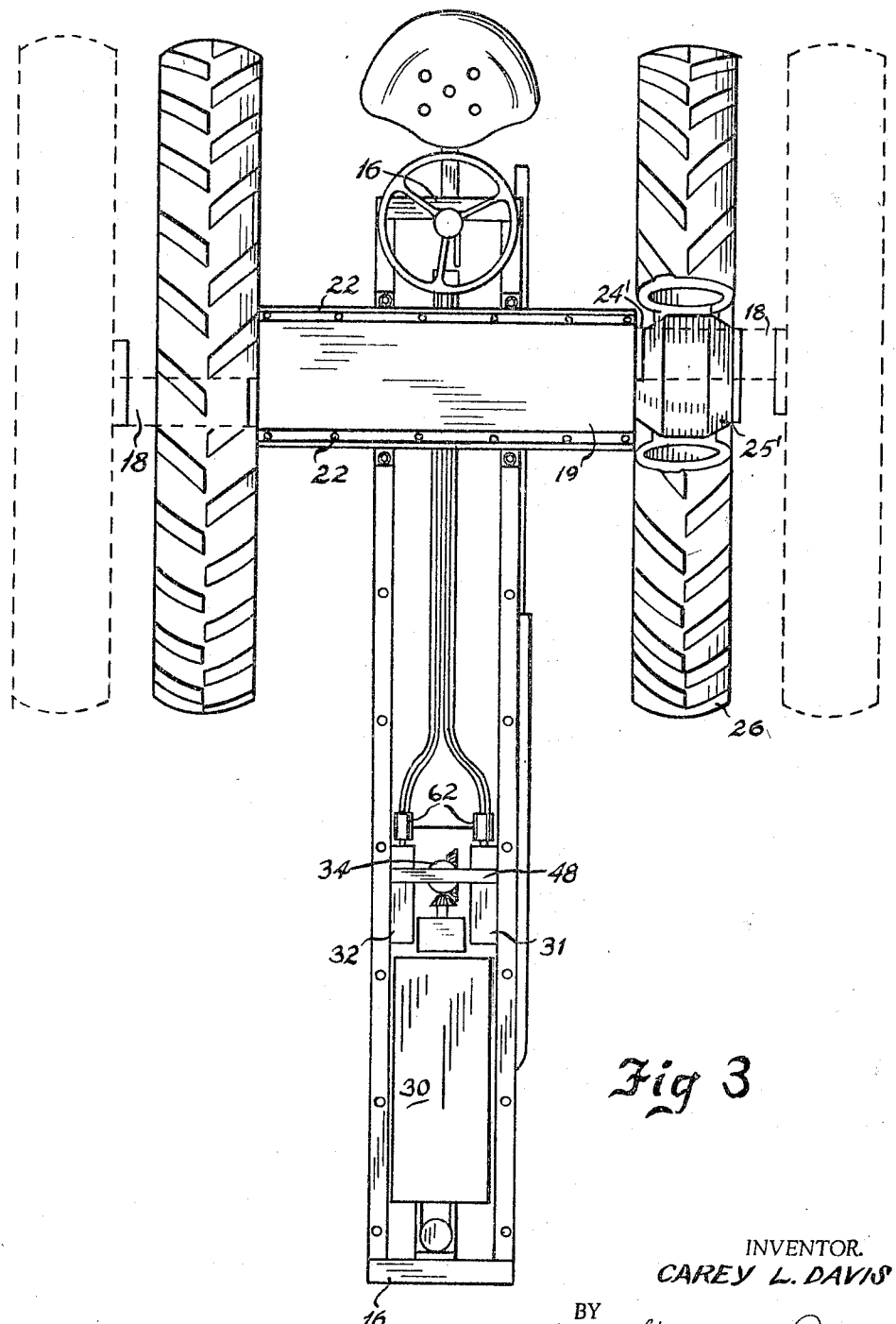
FIG. 3 is a top plan view of the tractor shown in FIG. 1.

Referring now more particularly to the drawings, and to that embodiment here chosen by way of illustration, the tractor shown in FIGS. 1 and 3, includes a rectangular frame 10 formed of upper longitudinal channel members 11 and lower longitudinal channel members 12 connected together in spaced relationship by end members 14 and 15 on the front and rear respectively. Transverse channel members 16 complete the rectangular frame 10.

The drive wheels for the tractor are carried by transverse arms 18 which are slidably received within a housing 19, the housing 19 being attached to the top of the frame 10. Since the wheel carrying arms are on the top of the frame 10, there is considerably more crop clearance than is normally had in tractors of this general variety.

The housing 19 can be easily formed of a pair of right angled plates 20 bolted together to form the rectangular housing 19. The housing 19 is divided longitudinally by a center wall 21 to provide two arm receiving compartments, each of the compartments receiving one of the arms 18. It will thus be seen, that by loosening the bolts 22 that secure the plates 20 together, the arms 18 can be slid in or out; and, by tightening the bolts 22, the arms 18 can be held in any desired position.

Depending from each of the arms 18, there are wheel carrying members 24 and 24' which have hydraulic motors 25 and 25' fixed to the lower end thereof. The drive wheels 26 are mounted on the output shaft of the hydraulic motors 25 and 25' in conventional fashion.

The housing 19 is secured to the top of the frame 10 by removable fasteners such as bolts so the entire housing 19 can be located anywhere along the frame 10. This feature allows the drive wheels 26 to be mounted on the opposite end of the tractor as shown in broken lines in FIG. 1; and, the castor wheel 28 can be moved to the rear of the frame 10 so that the wheels are reversed, as shown in the broken lines in FIG. 1.

Figure 5:
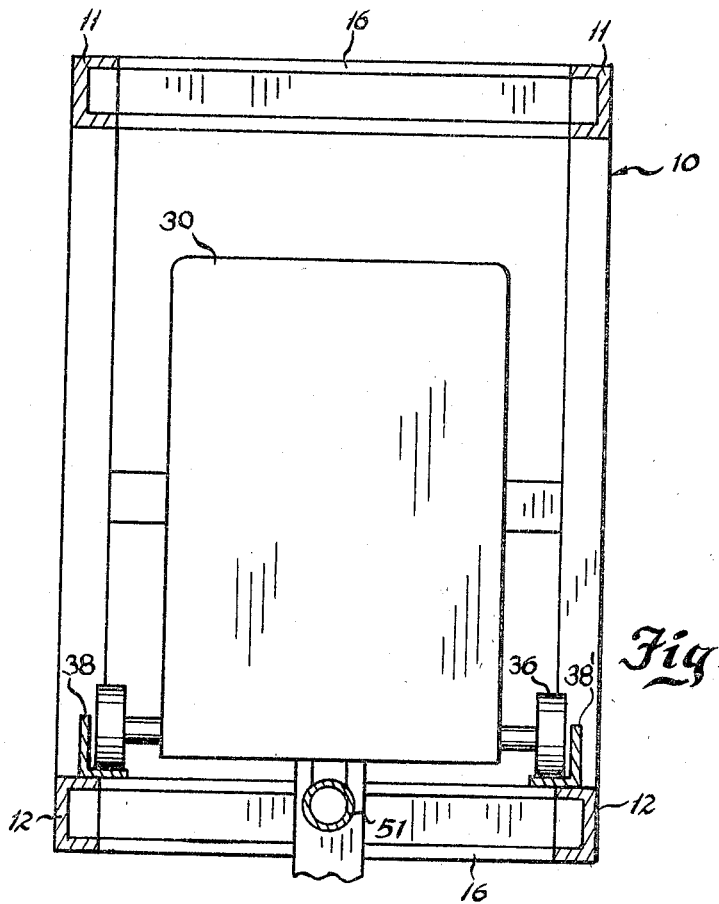
FIG. 5 is a transverse cross-sectional view taken along the line 5—5 in FIG. 1.

There is an engine 30 movably mounted within the frame 10, as is best shown in FIGS. 1 and 5. The engine 30 may be a gasoline engine or any other convenient source of power to drive the pumps 31, 32 and 34 which will be described later.

The engine 30 is mounted on a carriage 35; and the carriage 35 is provided with wheels 36. Two longitudinal tracks 38 and 38' are mounted on the lower longitudinal channel members 12, one track being on each of the members 12. The wheels 36 on the carriage 35 are so spaced that they engage the tracks 38 and 38' to ride therealong.

Figure 6:
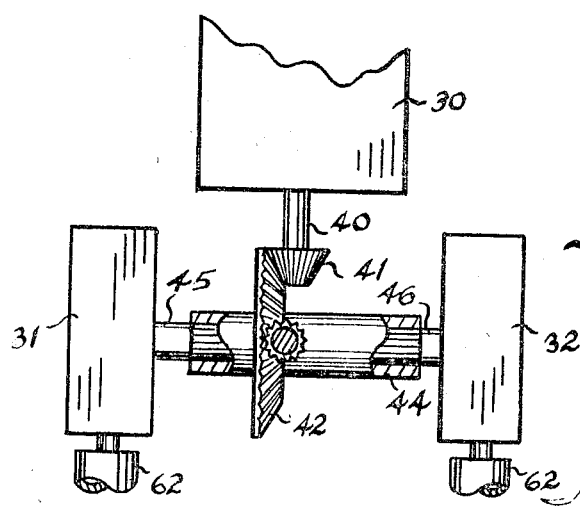
FIG. 6 is a top plan view of the pumps and their drive means.

Also, on the carriage 35 at the rear end of the engine 30, there are three pumps 31, 32 and 34, arranged to be driven by the engine 30. The pumps and their drive means are best shown in FIGS. 2 and 6 of the drawings. The output shaft 40 of the engine 30 has a bevel gear 41 thereon to drive a complementary bevel gear 42. The bevel gear 42 is carried by a sleeve 44 and is fixed to the sleeve 44 for rotation therewith.

The pumps 31 and 32 are the main drive pumps for the tractor, and are mounted axially of the sleeve 44 with their drive shafts 45 and 46 projecting into the opposite ends of the sleeve 44. The sleeve 44, and the drive shafts 45 and 46, are splined in known fashion to give a driving engagement between the sleeve 44 and the shafts 45 and 46. This arrangement is desired so one of the pumps 31 and 32 can be removed without disassembling the entire drive mechanism.

A U-shaped bracket 48 is secured to the carriage 35, and is inverted so the center bar is horizontally disposed over the top of the pumps 31 and 32. The pump 34 is attached to the bracket 48 with its drive shaft 49 extending toward the bevel gear 42, and a bevel gear 50 on the drive shaft 49 meshes with the bevel gear 42. Therefore, the bevel gear 42 is driven by the engine 30, and the pumps 31, 32 and 34 are driven by the bevel gear 42.

A hydraulic cylinder 51 is provided to move the carriage 35. The cylinder 51 is pivotally attached to the frame 10, and the piston rod 52 is attached to a finger 54 depending from the carriage 35; thus, as the rod 52 is projected, the carriage 35 will be moved rearwardly of the frame 10 and as the rod 52 is retracted, the carriage 35 will be moved forwardly of the frame 10. The fluid circuit to activate the cylinder 51 will be discussed hereinafter.

It is contemplated that a combustion engine will be used for the engine 30. In such case, there will be exhaust fumes which it is desirable to discharge behind the operator of the vehicle. To accomplish this, regardless of the longitudinal position of the engine 30, there is a stationary tailpipe 55 secured to the frame 10 by appropriate brackets.

The exhaust pipe 56 coming from the engine 30 is of a sufficiently large diameter that it will telescope over the tailpipe 55; therefore, as the engine moves rearwardly, the pipes 55 and 56 will telescope together, and as the engine moves forward, the pipes will move apart. The tailpipe 55 remains stationary so that exhaust fumes will always be discharged at the rearmost end of the tractor.

Figure 4:
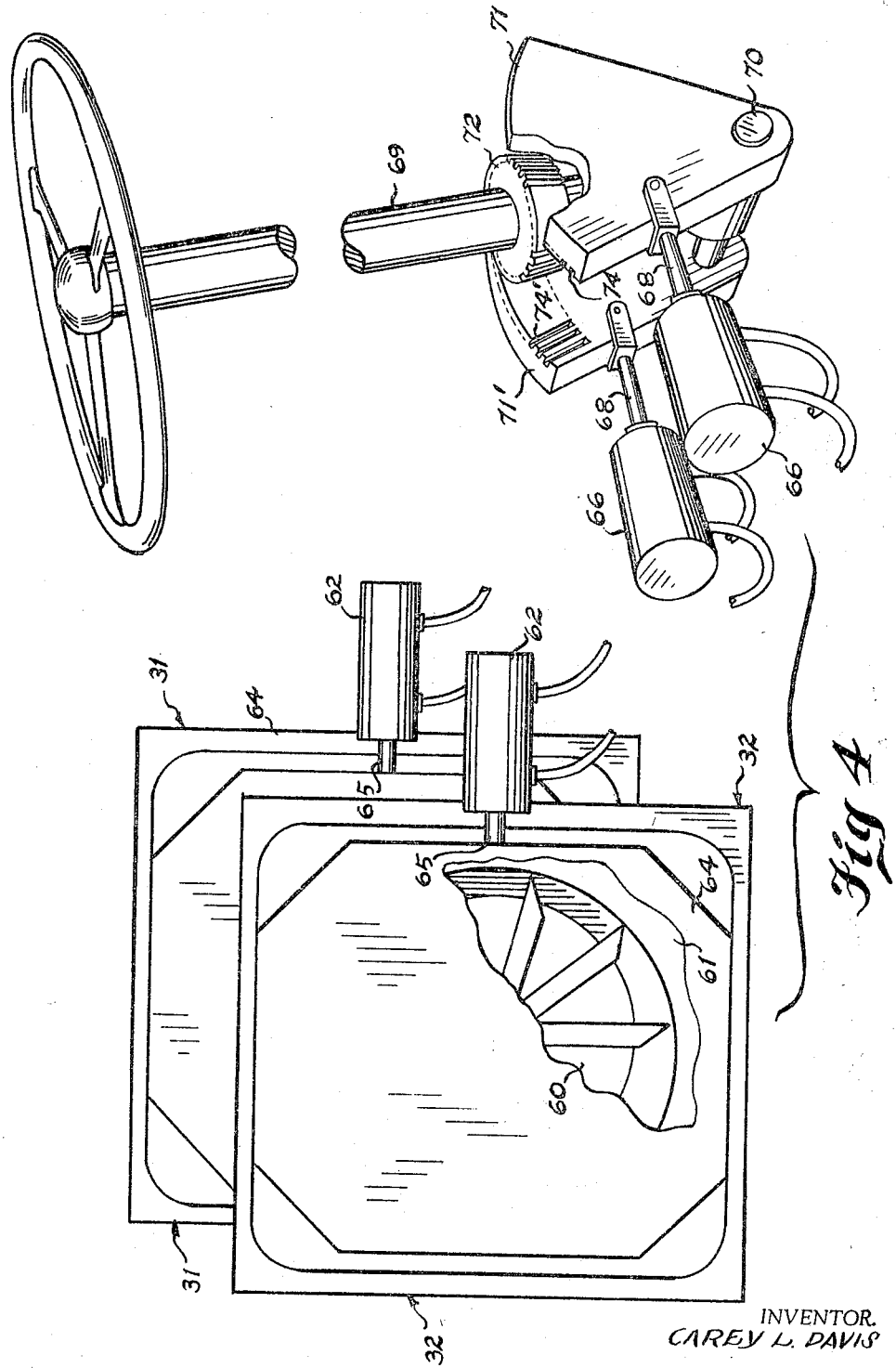
FIG. 4 is a perspective view showing the control means for the hydraulic pumps.

As shown in FIG. 4, pumps 31 and 32 are of the sliding vane variety. It is well known in the art that such pumps can be arranged to have a variable output pressure by changing the eccentricity of the rotor 60 with respect to the housing 61. When the rotor 60 is concentric with the opening in the housing 61, the output pressure is zero; and, when the rotor 60 is tangent to the opening in the housing 61, the output pressure is at a maximum. When the rotor is tangent to the housing but shifted to the other diametrical side of the housing, the pressure is reversed. This construction and arrangement is well known in the art, and should be understood from the above brief description.

To shift the housing 61 with respect to the rotor 60, hydraulic cylinders 62 are provided. The cylinders 62 are attached to a casing 64; and, the piston rods 65 project through the casing 64, and are attached to the housing 61. The eccentricity of the rotor 60 with respect to the housing 61 can, through cylinders 62, be shifted from zero to the maximum.

The hydraulic cylinders 62 are slave units that are controlled by master hydraulic cylinders 66. There is a ratio of 1:1 between hydraulic cylinders 66 and hydraulic cylinders 62, so that there will be equal movement of the cylinder rods of the two cylinders.

At the rear end of the frame 10, there is a control column 69 pivotally carried by the frame 10 at 70 and extending upwardly above the frame 10. A pair of sectors 71 and 71′ is also pivoted at 70, and one of the sectors is on each side of the control column 69. There is a control gear 72 axially mounted on the control column 69 and adapted to engage complementary beveled gear portions 74 and 74′ on the sectors 71 and 71′. The control column 69 is so mounted that it is rotatable about its vertical, longitudinal axis, and can be pivoted about the pivot 70.

It will now be seen that the piston rods 68 of the hydraulic cylinders 66 are connected to the sectors 71 and 71′; therefore, as each of the sectors 71 and 71′ is pivoted about its axis at 70, one of the control rods 68 will be moved in accordance therewith. As the piston rods 68 are moved, the cylinder rods 65 will be moved the same amount to shift the housings 61 of the pumps 31 and 32. If the control column 69 be rotated, thereby rotating the gear 72, one of the sectors 71 or 71′ will be pivoted in one direction, and the other sector will be moved in the opposite direction. In this case, one of the pumps 31 and 32 will be moved to less eccentricity, thereby giving a higher output pressure and volume on one pump than the other. If the control column 69 is simply pivoted about its axis at 70, both sectors 71 and 71′ will be moved to the same extent in the same direction, thereby causing equal movement of both piston rods 68, and both piston rods 65 of hydraulic cylinders 62, and giving equal movement to the housings 61 of the pumps 31 and 32 to change the output pressures of both pumps to the same extent.

Figure 7:
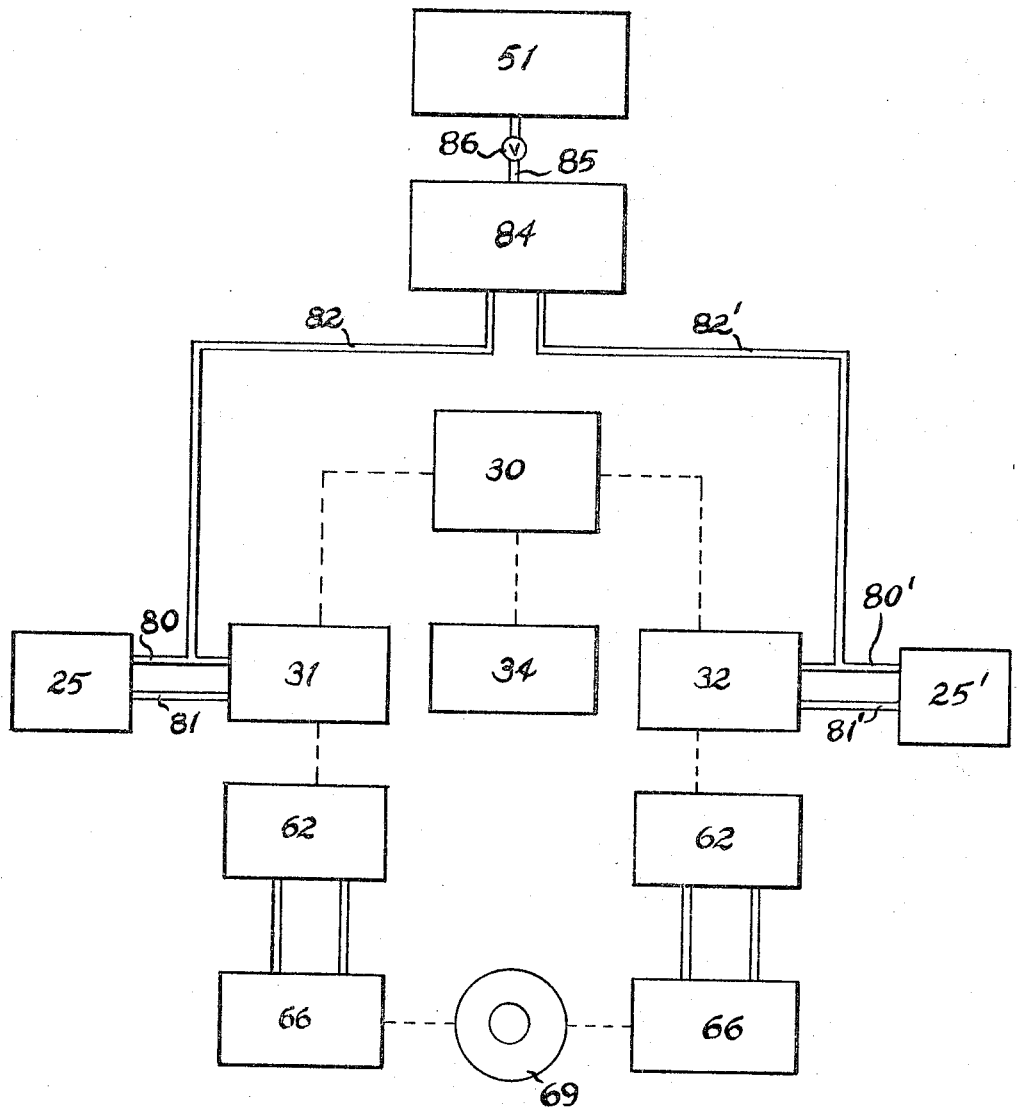
FIG. 7 is a schematic diagram of the hydraulic circuit to be used with the present tractor.

Attention is now directed to FIG. 7 of the drawings for a better understanding of the hydraulic circuit of the present device. Here it will be seen that each of the pumps 31 and 32 is connected to drive one of the motors 25 and 25′. To accomplish this there are high pressure lines 80 and 80′ leading from the pumps 31 and 32 to the motors 25 and 25′, and return lines 81 and 81′ leading from the motors 25 and 25′ to the pumps 31 and 32. Branch lines 82 and 82′ lead from the high pressure lines 80 and 80′ to a position valve 84.

The position valve 84 is a valve of a type well known in the arts as a "pop" valve. These valves are so designed that the valve will be closed until a particular, pre-set pressure is reached, then the valve will be opened. Once the position valve 84 is opened, fluid will flow through the lines 85 to the position cylinder 51 to move the engine 30 to a new location.

It is preferable that the engine 30 be as nearly over the drive wheels as possible; so, it may be desirable to have a step by step arrangement by which the engine 30 is moved only to the extent necessary for the particular amount of force exerted toward raising the front end of the tractor.

Also, when the drive wheels are moved to the front of the frame 10, the engine 30 should remain at the front of the tractor. To allow this, a hand operated valve 86 is in the line 85 to render the pop valve ineffective.

From the foregoing discussion, the operation of the device should be obvious. The engine, or prime mover 30 is started, and will drive the pumps 31, 32 and 34 through the gears 41 and 42. If the control shaft 69 is back in the neutral position, the rotors 60 of the pumps 31 and 32 will be concentric with the housing 61 and will cause a zero pressure on the motors 25 and 25′, causing no motion of the tractor. When the control column 69 is moved forward, the master cylinder 66 will move the slave cylinders 62 and cause an eccentricity of the rotors 60 with respect to the housings 61 of the pumps 31 and 32, thereby giving a positive pressure on the motors 25 and 25′ to cause rotation of the motors and consequent movement of the tractor.

When the control column is moved back, the housing will be shifted sufficiently to reverse the flow of fluid in the pumps and reverse the motors, hence reverse the movement of the tractor. If the control column 69 is rotated clockwise as viewed in FIG. 4, the sector 71 will be moved forward to cause the rotor 60 of the pump 31 to be moved toward concentricity, while the sector 71′ is moved rearwardly, to move the rotor 60 of the pump 32 to eccentricity. The pump 32 will therefore cause its motor 25′ to rotate faster than the motor 25 that is driven by the pump 31; since the pump 32 drives the right drive wheel 26, the right wheel will be driven faster to cause the tractor to turn to the left. Rotation of the control column 69 in the opposite direction will have the opposite effect to cause a righthand turn of the tractor. Thus, the tractor can be steered even if the castor wheel is off the ground, or for another reason has little traction.

It is contemplated that, when starting work with the tractor, the engine 30 will be in its rearmost position, and will be moved forward when necessary to give a greater hold down force on the front end of the tractor. The front end of a tractor normally tends to rear when the tractor is pulling a very heavy or immovable load. In FIG. 7, it will be seen that the cylinder 51 is controlled through the high pressure side of the pumps 31 and 32; therefore, a high pressure in the lines 80 and 80′ is required to open the position valve 84 to actuate the cylinder 51 and move the engine 30. The position valve 84 is so set that the valve will not open until there is an extremely large force on the valve 84. It will therefore be automatic that, when the tractor is pulling very hard, there will be a high pressure in the lines 80 and 80′ from the pumps 31 and 32, therefore giving a high pressure in the lines 82, and a high pressure in the valve 84 which will open the valve 84 and allow fluid to flow into the cylinder 51 to change position of the engine 30 in response to the pulling force of the tractor.

It will be understood that flexible hoses will connect the pumps 31 and 32 with the motors and the other equipment so that the carriage 35 can move freely without affecting the operation of the tractor. It is also contemplated that the flexible hoses will be sufficiently long that heat will be dissipated while the hydraulic fluid is in the lines.

Numerous implements that are used with tractors require power from the tractor. For this purpose the auxiliary pump 34 is provided. Hydraulic lines can conveniently be run from the auxiliary pump 34 to the various implements that may be pulled by the tractor.

It will, of course, be understood by those skilled in the art, that the device here presented is by way of illustration only, and is meant to be in no way restrictive; therefore, numerous changes and modifications may be made, and the full use of equivalents resorted to without departing from the spirit or scope of the invention as outlined in the appended claims.

What is claimed as invention is:

1. A tractor including a frame, a pair of hydraulic motors carried by said frame, a pair of drive wheels, one of said drive wheels being carried by each of said hydraulic motors to be driven by the hydraulic motor, a prime mover in said frame and movable longitudinally of said frame, a pair of hydraulic pumps mounted adjacent said prime mover and being movable therewith, each of said hydraulic pumps being arranged to drive one of said hydraulic motors, hydraulic means for moving said prime mover longitudinally of said frame, said hydraulic means being responsive to the high pressure lines of said hydraulic motors, the arrangement being such that when the pressure in the high pressure line is high the prime mover will be moved away from said drive wheels, and when the pressure in said high pressure line is low, said prime mover will be moved toward said drive wheels, said pair of hydraulic pumps having a variable output pressure, and control means for varying the output pressure of said pair of hydraulic pumps.

2. A tractor including a frame, a housing removably secured to said frame, a pair of arms, said pair of arms being slidably received by said housing such that each of said arms projects to one side of said frame, a pair of drive wheels, each of said drive wheels being carried by one of said arms, drive means for rotating said drive wheels, a prime mover in said frame and movable longitudinally of said frame, longitudinal movement of said prime mover being responsive to said drive means, and control means to control said drive means to cause said drive wheels to rotate at different speeds while maintaining separate torques independent of each other.

3. A tractor including a frame, a housing removably secured to said frame, a pair of arms, said pair of arms being slidably received by said housing such that each of said arms projects to one side of said frame, a pair of hydraulic motors, one of said hydraulic motors being carried by each of said arms, a pair of drive wheels, each of said drive wheels being carried by the rotor of one of said hydraulic motors, a prime mover carried by said frame and longitudinally movable therein, a pair of hydraulic pumps adjacent said prime mover and arranged to be driven thereby, said pair of hydraulic pumps being of variable output, a control column, means operable by said control column to vary the output of said pair of hydraulic pumps, said pair of hydraulic pumps being operably connected to said pair of hydraulic motors so the output of said pair of hydraulic motors varies as the output of said pair of hydraulic pumps vary, hydraulic means for moving said prime mover in response to the output pressure of said pair of hydraulic pumps.

4. The device as claimed in claim 3, said means operable by said control column including a gear on said control column, a pivotally mounted sector gear meshing with said gear a master hydraulic cylinder operable by said sector gear, a slave hydraulic cylinder operable by said master hydraulic cylinder, said slave hydraulic cylinder being arranged to vary the output of said pair of hydraulic pumps.

5. A tractor having a plurality of drive wheels, a plurality of hydraulic motors, each of said hydraulic motors being arranged to drive one of said drive wheels, a plurality of variable volume and variable pressure pumps, each of said pumps being arranged to supply fluid to one of said motors, each of said pumps being a sliding vane pump having a shiftable casing to vary the output thereof, means for shifting the casings of said pumps including a plurality of master hydraulic cylinders, a plurality of slave hydraulic cylinders, each of said slave hydraulic cylinders being connected to one of said master hydraulic cylinders to be controlled by said one of said master hydraulic cylinders, each of said slave hydraulic cylinders being arranged to control the pressure and the direction of flow of one of said hydraulic pumps, and control means to control said master hydraulic cylinders.

6. A vehicle comprising two drive wheels, an hydraulic motor operatively connected to driving relationship with each of said drive wheels, a variable displacement pump connected to each of said hydraulic motors, power means for driving both of said pumps, control means for varying the fluid output of each of said pumps including a rotatable and pivotal steering column and an hydraulic linkage connected between each of said pumps and said steering column, said steering column including a control gear connected thereto, said hydraulic linkages each including a follower gear meshing with said control gear, a master hydraulic cylinder connected to said follower gear, a slave hydraulic cylinder hydraulically connected to said master hydraulic cylinder, and said slave hydraulic cylinder connected to one of said variable displacement pumps, whereby rotation and pivoting of said steering column controls the displacement of said variable displacement pumps.

7. Apparatus for controlling the speed and direction of rotation of a pair of driving members comprising a pair of hydraulic motors for connection to the driving members, a reversible flow variable displacement pump ocnnected to each of said hydraulic motors, power means connected to said pumps, control means for varying the fluid output of each of said pumps including a rotatable and pivotal steering column and an hydraulic linkage connected between each of said pumps and said steering column, said hydraulic linkages each including a slave cylinder connected to one of said variable displacement pumps, a master cylinder hydraulically connected to said slave cylinder, and said master cylinder connected to said steering column, whereby rotation and pivotaing of said steering column actuates said master cylinders to actuate said slave cylinders which controls the displacement of said variable displacement pumps to control the speed and direction of rotation of the driving members.

References Cited

UNITED STATES PATENTS

| Re. 15,243 | 12/1921 | Manly. | |
|---|---|---|---|
| 1,146,343 | 7/1915 | Morgan | 180—64 |
| 2,504,885 | 4/1950 | Schreck | 180—1 X |
| 2,791,284 | 5/1957 | Jackson | 180—6.48 |
| 2,941,609 | 6/1960 | Bowers et al. | 180—6.48 |
| 3,154,164 | 10/1964 | Shaw et al. | 180—6.48 X |

FOREIGN PATENTS 786,590   11/1957   Great Britain.

BENJAMIN HERSH, *Primary Examiner.*

MILTON L. SMITH, *Examiner.*